United States Patent
Johansson

(10) Patent No.: US 8,970,478 B2
(45) Date of Patent: Mar. 3, 2015

(54) AUTOSTEREOSCOPIC RENDERING AND DISPLAY APPARATUS

(75) Inventor: Panu Marten Jesper Johansson, Tampere (FI)

(73) Assignee: Nokia Corporation, Espoo (FI)

( * ) Notice: Subject to any disclaimer, the term of this patent is extended or adjusted under 35 U.S.C. 154(b) by 157 days.

(21) Appl. No.: 13/501,732

(22) PCT Filed: Oct. 14, 2009

(86) PCT No.: PCT/EP2009/063420
§ 371 (c)(1),
(2), (4) Date: Apr. 12, 2012

(87) PCT Pub. No.: WO2011/044936
PCT Pub. Date: Apr. 21, 2011

(65) Prior Publication Data
US 2012/0200495 A1    Aug. 9, 2012

(51) Int. Cl.
*G09G 5/00* (2006.01)
*G06T 15/00* (2011.01)
(Continued)

(52) U.S. Cl.
CPC ........ *H04N 13/0409* (2013.01); *G06F 3/04815* (2013.01); *G06F 3/011* (2013.01);
(Continued)

(58) Field of Classification Search
CPC . G06T 2200/04; G06T 2200/08; G06T 19/00; G06T 19/003; G06T 19/006; G06T 19/20; G06T 15/00; G06T 15/005; G06T 15/02; G06T 15/04; G06T 15/06; G06T 15/08; H04N 13/0239; H04N 13/0497; H04N 13/0409; H04N 13/0242; H04N 13/0413; H04N 13/0425; H04N 13/0282
USPC ......... 345/664, 661, 679, 676, 653, 650, 419, 345/204, 426, 156; 715/757, 782, 848, 850, 715/852; 348/59, 40; 382/128; 359/472, 15, 359/232, 35, 463, 464; 349/15
See application file for complete search history.

(56) References Cited

U.S. PATENT DOCUMENTS 5,872,590 A    2/1999   Aritake et al.
5,959,664 A *  9/1999   Woodgate ............... 348/59
(Continued)

FOREIGN PATENT DOCUMENTS

CN   1934874 A      3/2007
CN   201060370 Y   5/2008
(Continued)

OTHER PUBLICATIONS

Office Action received for corresponding Russian Application No. 2012118591, dated Jul. 29, 2013, 6 pages.
(Continued)

*Primary Examiner* — Ariel Balaoing
*Assistant Examiner* — Darlene M Ritchie
(74) *Attorney, Agent, or Firm* — Harrington & Smith

(57) ABSTRACT

An apparatus comprising a sensor configured to detect the position and orientation of a user viewpoint with respect to an auto-stereoscopic display; a processor configured to determine a surface viewable from the user viewpoint of at least one three dimensional object; and an image generator configured to generate a left and right eye image for display on the auto-stereoscopic display dependent on the surface viewable from the user viewpoint.

16 Claims, 11 Drawing Sheets

(51) Int. Cl.
  *G09G 5/08* (2006.01)
  *H04N 13/00* (2006.01)
  *H04N 13/04* (2006.01)
  *G02B 27/22* (2006.01)
  *G02F 1/1335* (2006.01)
  *G06F 3/0481* (2013.01)
  *G06F 3/01* (2006.01)
  *H04N 13/02* (2006.01)

(52) U.S. Cl.
  CPC ........ *H04N 13/004* (2013.01); *H04N 13/0278* (2013.01); *H04N 13/0402* (2013.01); *H04N 13/0413* (2013.01); *H04N 13/0456* (2013.01); *H04N 13/0468* (2013.01); *H04N 13/0472* (2013.01); *H04N 13/0497* (2013.01); *H04N 13/0014* (2013.01); *H04N 13/0484* (2013.01)
  USPC ............ 345/156; 345/419; 345/166; 345/1.1; 348/40; 348/51; 359/462; 349/15

(56) References Cited

U.S. PATENT DOCUMENTS

| | | | |
|---|---|---|---|
| 6,876,362 B1* | 4/2005 | Newhall et al. | 345/426 |
| 8,334,867 B1* | 12/2012 | Davidson | 345/419 |
| 8,416,268 B2* | 4/2013 | Tomisawa et al. | 345/679 |
| 2002/0109701 A1 | 8/2002 | Deering | |
| 2003/0179198 A1 | 9/2003 | Uchiyama | |
| 2005/0185276 A1* | 8/2005 | Tomisawa et al. | 359/472 |
| 2005/0264559 A1* | 12/2005 | Vesely et al. | 345/419 |
| 2006/0001596 A1 | 1/2006 | Cuffaro | |
| 2006/0012675 A1 | 1/2006 | Alpaslan et al. | |
| 2006/0139447 A1* | 6/2006 | Unkrich | 348/51 |
| 2006/0152580 A1 | 7/2006 | Andrews | |
| 2007/0064199 A1 | 3/2007 | Schindler et al. | |
| 2009/0128900 A1* | 5/2009 | Grasnick | 359/462 |
| 2010/0007636 A1 | 1/2010 | Tomisawa et al. | |
| 2010/0266176 A1* | 10/2010 | Masumoto et al. | 382/128 |
| 2010/0309296 A1* | 12/2010 | Harrold et al. | 348/54 |
| 2010/0328306 A1* | 12/2010 | Chau et al. | 345/419 |

FOREIGN PATENT DOCUMENTS

| | | |
|---|---|---|
| EP | 0656555 A1 | 6/1995 |
| EP | 0721131 | 7/1996 |
| EP | 0845737 A2 | 6/1998 |
| EP | 1566975 A1 | 8/2005 |
| WO | 2005/118998 A1 | 12/2005 |
| WO | 2008/041313 A1 | 4/2008 |
| WO | 2008/132724 A1 | 11/2008 |
| WO | WO-2009044437 A1 | 4/2009 |

OTHER PUBLICATIONS

Cascia et al., "Fast, Reliable Head Tracking Under Varying Illumination: An Approach Based on Registration of Texture-Mapped 3D Models", In IEEE Transactions on Pattern Analysis and Machine Intelligence, 1999, pp. 1-35.

Hwang et al., "Hand-held Virtual Reality: A Feasibility Study", In Proceedings of the ACM symposium on Virtual reality software and technology, 2006, pp. 356-363.

Dodgson, "Autostereoscopic 3D Displays", In IEEE Computer, vol. 38, Issue: 8, Aug. 2005, pp. 31-36.

Borcsok et al., "Autostereoscopic Adaptive 3D Multi-Screen System", International Conference on Consumer Electronics, 2001, pp. 192-193.

Dimitropoulos et al., "3D Content Generation for Autostereoscopic Displays", 3DTV Conference: The True Vision—Capture, Transmission and Display of 3D Video, May 4-6, 2009, 4 pages.

International Search Report and Written Opinion received for corresponding International Application No. PCT/EP2009/063420, dated Aug. 10, 2010, 20 pages.

* cited by examiner

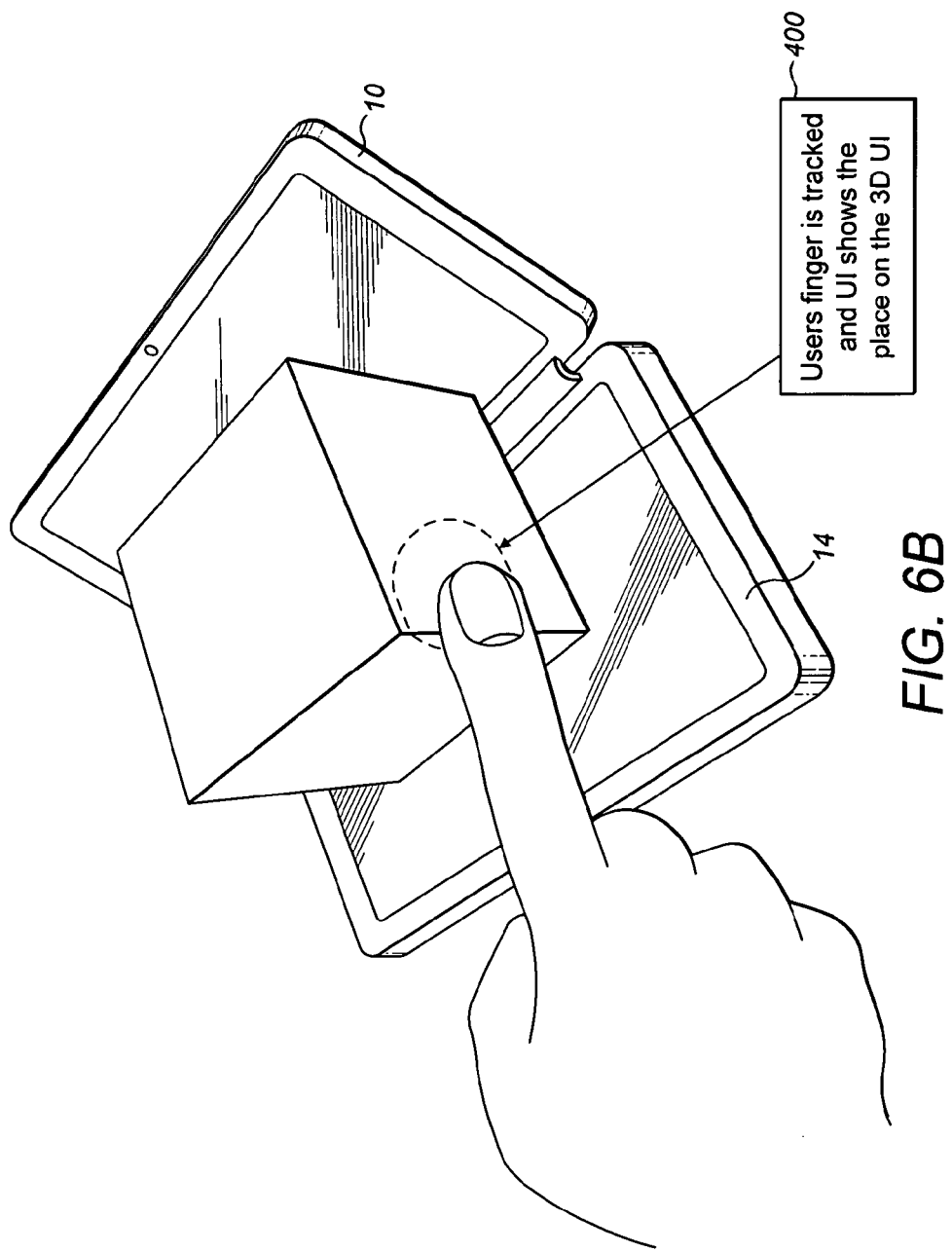

AUTOSTEREOSCOPIC RENDERING AND DISPLAY APPARATUS

RELATED APPLICATION

This application was originally filed as PCT Application No. PCT/EP2009/063420 filed Oct. 14, 2009.

BACKGROUND OF THE INVENTION

The present application relates to a method and apparatus for auto-stereoscopic displays. In some embodiments the method and apparatus relate to auto-stereoscopic image displays and in particular, but not exclusively limited to, some further embodiments relate to auto-stereoscopic display for mobile apparatus.

Stereoscopic image displays have the potential to significantly improve the user's experience of operating and interacting with modern electronic devices. So-called 3D display technology or stereoscopic display technology generates images to the left and right eye separately in order to fool the user into believing that say are viewing a three dimensional image. Traditional stereoscopic displays present images for the left and right eye and then use filters placed over each eye so that the left eye only views the image for the left eye and the right eye only views the image for the right eye. An example of such technology is polarization filtering where images for the left and right eye are modulated by a different polarisation. This technology is currently favoured in 3D cinemas. Such technology, although capable of presenting 3D images of objects requires each user to be equipped with the required filters, typically in the form of a pair of over-spectacles in order to view the image.

Auto-stereoscopic displays which do not require the user to wear any device to filter the left and right images but instead filters or directs the images directly to the correct eye, are rapidly becoming commercially realisable. These auto-stereoscopic devices remove a significant barrier to the use of 3D displays for everyday use. Such displays use a range of optical elements in combination with a display to focus or direct the left and right view to the left and right eye respectively.

However such auto-stereoscopic systems can present images which appear distracting rather than immersive and can often lack the visual cues which the human visual system would expect such as reflections and shadowing.

Furthermore interaction with the image displayed is typically limited. Auto-stereoscopic displays typically have a limited range of viewing angles before the auto-stereoscopic view becomes poor. For example the location of the user with reference to the display and the movement of the user with reference to the display will typically only cause the user to experience a non-optimal image in that the viewing angle range for displaying a three dimensional image is exceeded.

Thus interaction with the image displayed on the 3D display and the illusion of 3D image presentation with regards to interaction is typically poorly implemented.

This application proceeds from the consideration that whilst auto-stereoscopic display panels can assist in display representations it may be advantageous to improve on such displays by use of additional displays and control interfaces.

Embodiments of the present application aim to address the above problems.

BRIEF SUMMARY OF THE INVENTION

There is provided according to a first aspect of the invention a method comprising: detecting the position and orientation of a user viewpoint with respect to an auto-stereoscopic display; determining a surface viewable from the user viewpoint of at least one three dimensional object; and generating a left and right eye image for display on the auto-stereoscopic display dependent on the surface viewable from the user viewpoint.

Detecting the position and orientation of a user may comprise: capturing at least one image of the user; determining the position and orientation of the user eyes with respect to the auto-stereoscopic display.

Capturing at least one image of the user may comprise capturing at least one image of the user from each of at least two cameras, and detecting the position and orientation may comprise comparing the difference between the at least one image of the user from each of the at least two cameras.

Determining a surface viewable from the user viewpoint may comprise: determining a model of the at least one three dimensional object; determining the distance and orientation from the at least one three dimensional object model to the user viewpoint; and generating a surface of the at least one three dimensional object dependent on the model of the at least one three dimensional object and the distance and orientation from the at least one three dimensional object model to the user viewpoint.

The method may further comprise: detecting an inter-pupil distance of a user; and controlling a parallax barrier dependent on at least one of: the position of the user viewpoint; the orientation of the user viewpoint; and the inter-pupil distance of the user.

The method may further comprise: determining a projection surface viewable from the user viewpoint of at least one three dimensional object on a second display; and generating a projection image for display on the second display dependent on the projection surface viewable from the user viewpoint.

The method may further comprise determining the projection surface viewable from the user viewpoint dependent on at least one of: at least one three dimensional object lighting angle and position; a second display surface model; and at least one three dimensional object surface model.

The projection surface may comprise at least one of: a partial shadow of the at least one three dimensional object; a total shadow of the at least one three dimensional object; and a reflection of the at least one three dimensional object.

The method may further comprise: detecting an object position with respect to either the auto-stereoscopic display and/or a second display; and determining an interaction by the detected object.

Detecting an object position may comprise at least one of: detecting an capacitance value in a capacitance sensor of the object; and detecting a visual image of the object.

Determining an interaction by the detected object may comprise determining an intersection between the detected image and a displayed image.

The displayed image may comprise at least one of: the virtual image of the at least one three dimensional object; and a two dimensional image displayed on the second display.

According to a second aspect of the invention there is provided an apparatus comprising at least one processor and at least one memory including computer program code the at least one memory and the computer program code configured to, with the at least one processor, cause the apparatus at least to perform: detecting the position and orientation of a user viewpoint with respect to an auto-stereoscopic display; determining a surface viewable from the user viewpoint of at least one three dimensional object; and generating a left and right eye image for display on the auto-stereoscopic display dependent on the surface viewable from the user viewpoint.

Detecting the position and orientation of a user may cause the apparatus at least to perform: capturing at least one image of the user; determining the position and orientation of the user eyes with respect to the auto-stereoscopic display.

Capturing at least one image of the user may cause the apparatus at least to perform capturing at least one image of the user from each of at least two cameras, and detecting the position and orientation may cause the apparatus at least to perform comparing the difference between the at least one image of the user from each of the at least two cameras.

Determining a surface viewable from the user viewpoint may cause the apparatus at least to perform: determining a model of the at least one three dimensional object; determining the distance and orientation from the at least one three dimensional object model to the user viewpoint; and generating a surface of the at least one three dimensional object dependent on the model of the at least one three dimensional object and the distance and orientation from the at least one three dimensional object model to the user viewpoint.

The computer program code configured to with the at least one processor may further cause the apparatus at least to perform: detecting an inter-pupil distance of a user; and controlling a parallax barrier dependent on at least one of: the position of the user viewpoint; the orientation of the user viewpoint; and the inter-pupil distance of the user.

The computer program code configured to with the at least one processor may further cause the apparatus at least to perform: determining a projection surface viewable from the user viewpoint of at least one three dimensional object on a second display; and generating a projection image for display on the second display dependent on the projection surface viewable from the user viewpoint.

The computer program code configured to with the at least one processor may further cause the apparatus at least to perform determining the projection surface viewable from the user viewpoint dependent on at least one of: at least one three dimensional object lighting angle and position; a second display surface model; and at least one three dimensional object surface model.

The projection surface may comprise at least one of: a partial shadow of the at least one three dimensional object; a total shadow of the at least one three dimensional object; and a reflection of the at least one three dimensional object.

The computer program code configured to with the at least one processor may further cause the apparatus at least to perform: detecting an object position with respect to either the auto-stereoscopic display and/or a second display; and determining an interaction by the detected object.

Detecting an object position may cause the apparatus at least to perform: detecting an capacitance value in a capacitance sensor of the object; and detecting a visual image of the object.

Determining an interaction by the detected object may cause the apparatus at least to perform determining an intersection between the detected image and a displayed image.

The displayed image may comprise at least one of: the virtual image of the at least one three dimensional object; and a two dimensional image displayed on the second display.

According to a third aspect of the invention there is provided an apparatus comprising: a sensor configured to detect the position and orientation of a user viewpoint with respect to an auto-stereoscopic display; a processor configured to determine a surface viewable from the user viewpoint of at least one three dimensional object; and an image generator configured to generate a left and right eye image for display on the auto-stereoscopic display dependent on the surface viewable from the user viewpoint.

The sensor may comprise a camera configured to capture at least one image of the user and a face recognizer configured to determine the position and orientation of the user eyes with respect to the auto-stereoscopic display.

There may be at least two cameras capturing at least one image of the user from each of the at least two cameras, and the face recognizer may compare the difference between the at least one image of the user from each of the at least two cameras.

The processor may determine a model of the at least one three dimensional object; determine the distance and orientation from the at least one three dimensional object model to the user viewpoint; and generate a surface of the at least one three dimensional object dependent on the model of the at least one three dimensional object and the distance and orientation from the at least one three dimensional object model to the user viewpoint.

The processor may further detect an inter-pupil distance of a user; and provide control information to a parallax barrier dependent on at least one of: the position of the user viewpoint; the orientation of the user viewpoint; and the inter-pupil distance of the user.

The processor may further determine a projection surface viewable from the user viewpoint of at least one three dimensional object on a second display; and the image generator may generate a projection image for display on the second display dependent on the projection surface viewable from the user viewpoint.

The processor may determine the projection surface viewable from the user viewpoint dependent on at least one of: at least one three dimensional object lighting angle and position; a second display surface model; and at least one three dimensional object surface model.

The projection surface may comprise at least one of: a partial shadow of the at least one three dimensional object; a total shadow of the at least one three dimensional object; and a reflection of the at least one three dimensional object.

The sensor may be further configured to detect an object position with respect to either the auto-stereoscopic display and/or a second display; and determine an interaction by the detected object.

The sensor may detect an object position by detecting at least one of a capacitance value in a capacitance sensor of the object; and a visual image of the object.

The processor may further determine an intersection between the detected image and a displayed image.

The displayed image may comprise the virtual image of the at least one three dimensional object.

The displayed image may comprise a two dimensional image displayed on the second display.

According to a fourth aspect of the invention there is provided a computer-readable medium encoded with instructions that, when executed by a computer perform: detect the position and orientation of a user viewpoint with respect to an auto-stereoscopic display; determine a surface viewable from the user viewpoint of at least one three dimensional object; and generate a left and right eye image for display on the auto-stereoscopic display dependent on the surface viewable from the user viewpoint.

According to a fifth aspect of the invention there is provided an apparatus comprising: detecting means for detecting the position and orientation of a user viewpoint with respect to an auto-stereoscopic display; modelling means for determining a surface viewable from the user viewpoint of at least one three dimensional object; and image generating means for generating a left and right eye image for display on the auto-stereoscopic display dependent on the surface viewable from the user viewpoint.

An electronic device may comprise apparatus as described above.

A chipset may comprise apparatus as described above.

For a better understanding of the present application and as to how the same may be carried into effect, reference will now be made by way of example to the accompanying drawings in which:

BRIEF DESCRIPTION OF THE DRAWINGS

FIG. 6b shows a further physical schematic representation of user interface interaction according to some embodiments of the application;

DETAILED DESCRIPTION OF THE INVENTION

Figure 1:
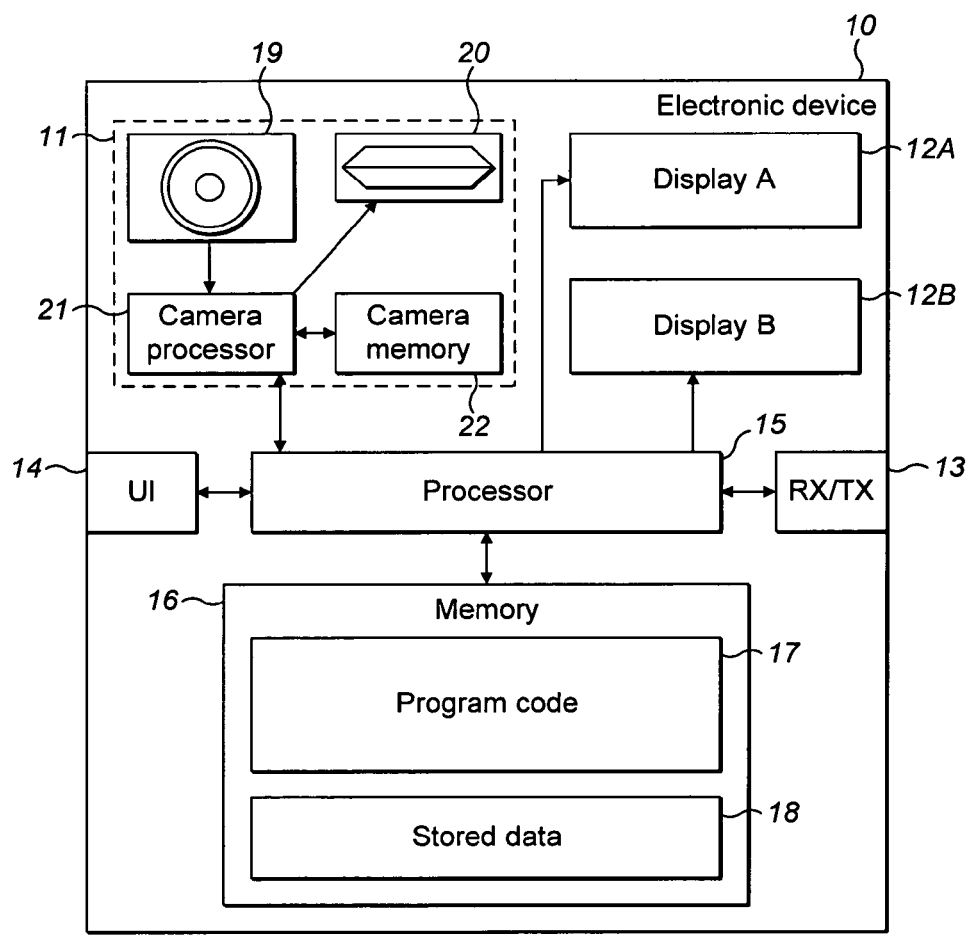
FIG. 1 shows a schematic representation of an apparatus suitable for implementing some embodiments of the application.

The application describes apparatus and methods to generate more convincing and interactive 3D image displays and thus create a more immersive and interactive user experience than may be generated with just one stereoscopic display unit. Thus as described hereafter in embodiments of the application the combination of two displays in a folding electronic device or apparatus with suitable sensors monitoring the user enables the apparatus to be configured such that the user experience of the 3D images displayed is greatly enhanced. Furthermore, in some embodiments the use of head tracking may be applied with the dual displays to enable further enhancement for the displayed images. In some further embodiments the configuration of user interface apparatus with the dual display configuration further enhances the perception and the interaction with the displayed images.

The following describes apparatus and methods for the provision of improved auto-stereoscopic image display and interaction. In this regard reference is first made to FIG. 1 which discloses a schematic block diagram of an exemplary electronic device 10 or apparatus on which embodiments of the application may be implemented. The electronic device 10 is configured to provide improved auto-stereoscopic image display and interaction.

The electronic device 10 is in some embodiments a mobile terminal, mobile phone or user equipment for operation in a wireless communication system. In other embodiments, the electronic device is any suitable electronic device configured to provide a image display, such as for example a digital camera, a portable audio player (mp3 player), a portable video player (mp4 player).

The electronic device 10 comprises an integrated camera module 11, which is linked to a processor 15. The processor 15 is further linked to a first display (display A) 12a, and a second display (display B) 12b. The processor 15 is further linked to a transceiver (TX/RX) 13, to a user interface (UI) 14 and to a memory 16. In some embodiments, the camera module 11 and/or the displays 12a and 12b are separate or separable from the electronic device and the processor receives signals from the camera module 11 and/or transmits and signals to the displays 12a and 12b via the transceiver 13 or another suitable interface.

The processor 15 may be configured to execute various program codes 17. The implemented program codes 17, in some embodiments, comprise image capture digital processing or configuration code, image displaying and image interaction code. The implemented program codes 17 in some embodiments further comprise additional code for further processing of images. The implemented program codes 17 may in some embodiments be stored for example in the memory 16 for retrieval by the processor 15 whenever needed. The memory 15 in some embodiments may further provide a section 18 for storing data, for example data that has been processed in accordance with the application.

The camera module 11 comprises a camera 19 having a lens for focusing an image on to a digital image capture means such as a charged coupled device (CCD). In other embodiments the digital image capture means may be any suitable image capturing device such as complementary metal oxide semiconductor (CMOS) image sensor. The camera module 11 further comprises a flash lamp 20 for illuminating an object before capturing an image of the object. The flash lamp 20 is linked to the camera processor 21. The camera 19 is also linked to a camera processor 21 for processing signals received from the camera. The camera processor 21 is linked to camera memory 22 which may store program codes for the camera processor 21 to execute when capturing an image. The implemented program codes (not shown) may in some embodiments be stored for example in the camera memory 22 for retrieval by the camera processor 21 whenever needed. In some embodiments the camera processor 21 and the camera memory 22 are implemented within the apparatus 10 processor 15 and memory 16 respectively.

A user of the electronic device 10 may in some embodiments use the camera module 11 for capturing images to be used in controlling the displays 12a and 12b as is described in later detail with respect to FIGS. 4a, 4b, 5a, and 5b and described later. In some other embodiments the camera module may capture images which may be transmitted to some other electronic device to be processed and provide the information required to interact with the display. For example where the processing power of the apparatus is not sufficient some of the processing operations may be implemented in further apparatus. Corresponding applications in some embodiments may be activated to this end by the user via the user interface 14.

In some embodiments the camera module comprises at least two cameras, wherein each camera is located on the same side of device.

In some embodiments of the application the camera processor 21 or the processor 15 may be configured to receive image data from the camera or multiple cameras and further process the image data to identify an object placed in front of the camera. Such objects capable of being identified by the camera processor 21 or processor 15 may be, for example, a face or head of the user, the eyes of the user, the finger or pointing device used by the user. Furthermore in some embodiments the camera processor 21 or processor may determine or estimate the identified object's position in front of the device. The use of this identification process and position estimation process will be described in further detail later.

The apparatus 10 may in embodiments be capable of implementing the processing techniques at least partially in hardware, in other words the processing carried out by the processor 15 and camera processor 21 may be implemented at least partially in hardware without the need of software or firmware to operate the hardware.

The user interface 14 in some embodiments enables a user to input commands to the electronic device 10. The user interface 14 may in some embodiments be implemented as, for example, a keypad, a user operated button, switches, or by a 'touchscreen' interface implemented on one or both of the displays 12a and 12b. Furthermore in some embodiments of the application some of the user interface functionality may be implemented from the camera 19 captured image information whereby the object identification and position information may be used to provide an input to the device.

The transceiver 13 enables communication with other electronic devices, for example in some embodiments via a wireless communication network.

Figure 2:
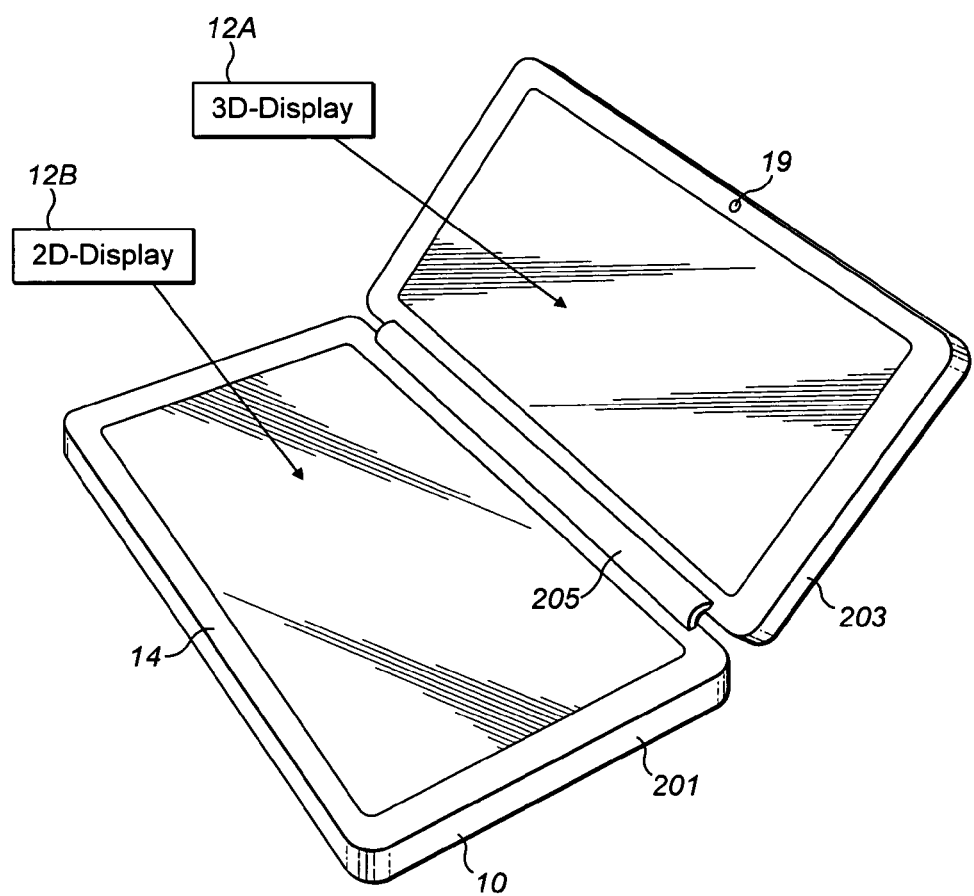
FIG. 2 shows a physical schematic representation of an apparatus as shown in FIG. 1 suitable for implementing some embodiments in further detail.

With respect to FIG. 2 a physical representation as implemented in some embodiments of the apparatus shown in FIG. 1 is shown in further detail. The apparatus 10 as shown in FIG. 2 may be implemented in a folding configuration. In such folding configuration embodiments as shown in FIG. 2, the apparatus comprises a first case part 203 and a second case part 201, both of which are connected together by a hinge 205. In some embodiments the hinge 205 operates not only as a mechanical connection between the first case part 203 and the second case part 201 but also implements an electrical connection between components within the first case part 203 and the second case part 201. In other embodiments the hinge is only a mechanical connection with the electrical connection being implemented separately. In some embodiments the electrical connection may be wired and provided for example by a flexible ribbon cable or in some other embodiments may be provided by a wireless connection between the first and second case parts.

Although the following embodiments are described with respect to a folding hinge configuration joining the first case part 203 and the second case part 201 some other embodiments of the application may implement a sliding connection whereby the first case part 203 slides over the second case part 201, in some such embodiments the first case part 203 is further configured to rotate and be angled with respect to the second case part 201 as the two parts slide so to produce a similar display orientation configuration. Such a sliding/rotating hinge may be similar to that seen currently on such user equipment as the Nokia N97.

Furthermore in some embodiments the first case part 203 and the second case part 201 may be configured to operation with a twist and rotatable hinge similar to that employed by 'tablet' portable computers wherein the hinge connecting the first case part 203 and the second case part 201 can be folded and unfolded to open up the apparatus but may also be twisted to protect or display the inner surfaces when the hinge is refolded.

The first case part 203 as shown in FIG. 2 is configured to implement on one surface the first display 12a which may be an auto-stereoscopic display (also known as the 3D display) and a camera 19. The 3D display 12a may be any suitable auto-stereoscopic display. For example the 3D display 12a may in some embodiments be implemented as a liquid crystal display with parallax barriers. The principle of parallax barriers is known whereby an optical aperture is aligned with columns of the liquid crystal display (LCD) pixels in order that alternate columns of LCD pixels can be seen by the left and right eyes separately. In other words the parallax barriers operate so that in some embodiments the even columns of the LCD pixels may be viewed by the left eye and the odd columns of the LCD pixels may be viewed by the right eye. In some embodiments the parallax barriers may be, in some embodiments, controllable and capable of controlling the angle of image presentation.

In some other embodiments of the application the auto-stereoscopic (3D) display 12a may be implemented as a lenticular optical configured liquid crystal display where cylindrical lenses are aligned with columns of LCD pixels to produce a similar effect to that of the parallax barriers. In other words, alternate columns of LCD pixels, which go to construct the alternate images for the left and right eyes are directed to the left and right eyes only. In further embodiments of the application 3D display may be implemented using micropolarisers. In further other embodiments, the 3D display may comprise a holographic display to create real images using a diffuse light source.

In some embodiments the first display, the 3D display, 12a may further comprise a touch input interface. In some embodiments the touch input interface may be a capacitive touch interface suitable for detecting either direct touch onto the display surface or detecting the capacitive effect between the display surface and a further object such as a finger in order to determine a position relative to the dimensions of the display surface and in some embodiments the position relative from the display surface.

Although the first display 12a as described above may be implemented as a LCD display it would be appreciated that any suitable display technology may be used to implement the display. For example in some embodiments the first display 12a may be implemented using light emitting diodes (LED) or organic light emitting diode (OLED) configuration featuring apertures or lenses configured to generate two separate images directed at the left and right eye of the user.

In some embodiments the first display 12a may be configured to operate in a 2D mode of operation. For example by switching off the parallax barrier layer in the embodiments employing a parallax barrier to direct the alternate pixel layers to the left and right eyes all of the rows of the pixels will be visible to both eyes.

The second case part 201 as shown in FIG. 2 is configured to implement on one surface the second display 12b which may be a 2D display 12b. The 2D display may be implemented using any suitable display technology, for example liquid crystal display (LCD), light emitting diodes (LED), or organic LED display technologies.

In further embodiments the second display 12b may comprise a second auto-stereoscopic (3D) display capable of being operable in a 2D mode—for example by switching off of the parallax barrier layer in a manner similar to that described above.

In some embodiments the second or 2D display 12b comprises a touch interface similar to the touch interface as described above with reference to the first display suitable for determining the position of an object both relative across the display surface and also relative from the display surface. Thus in some embodiments the touch interface comprises a capacitive touch interface suitable of determining the position of the object relative across and from the surface of the display by the determination of the capacitance of the display surface.

Figure 6A:
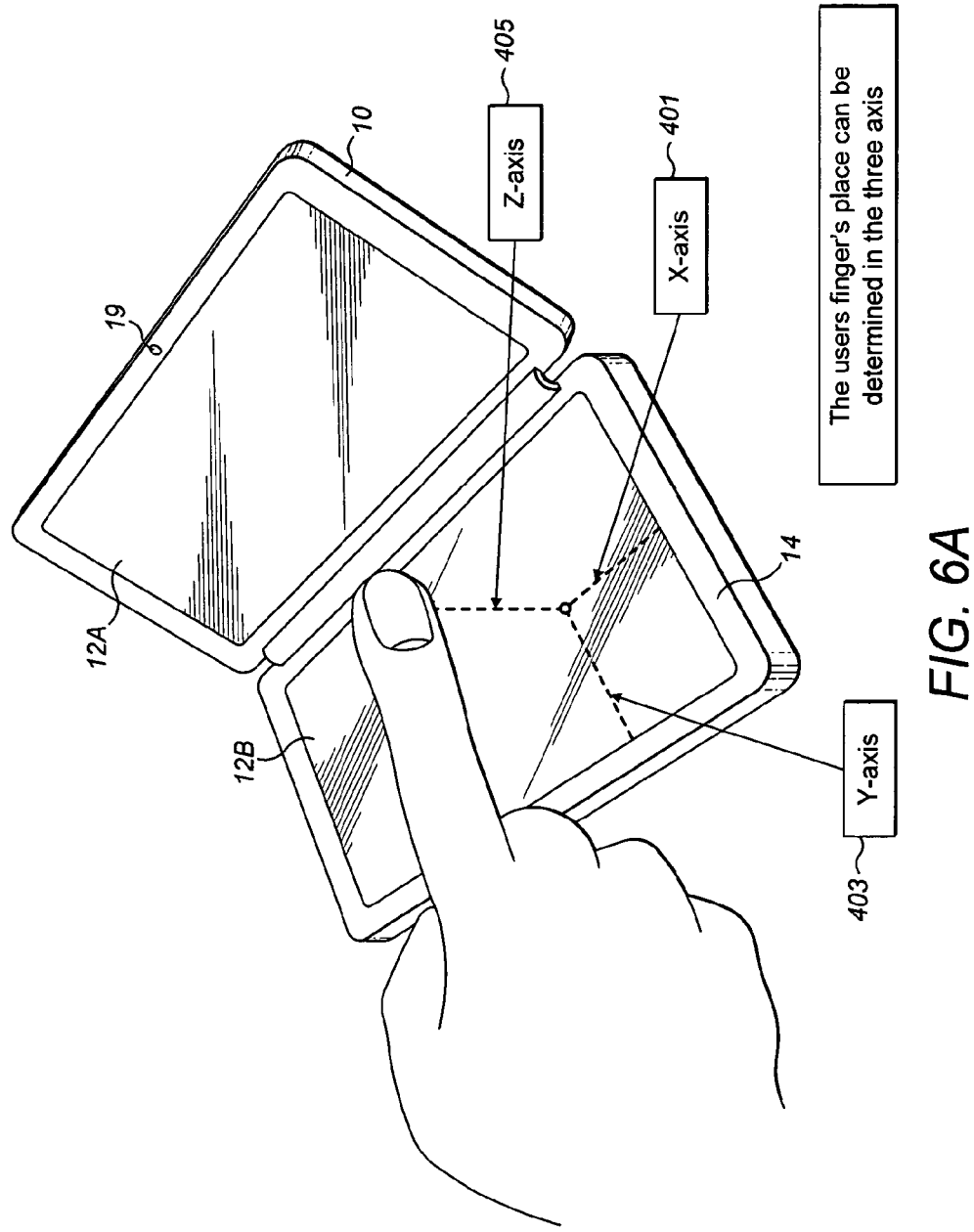
FIG. 6a shows a physical schematic representation of user interface interaction according to some embodiments of the application.
Figure 6C:
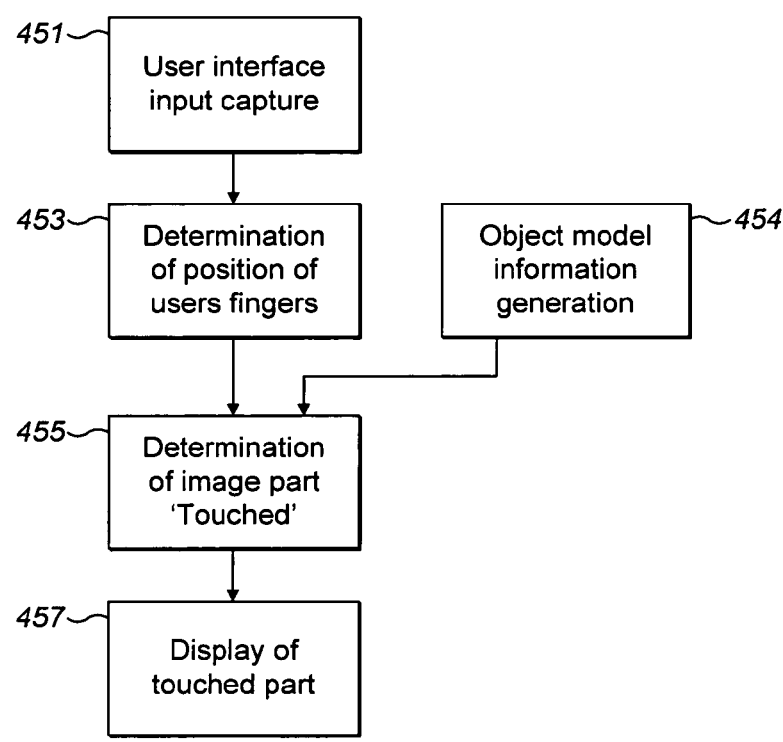
FIG. 6c shows a flow diagram of the processes carried out by user interface interaction according to some embodiments of the application.

The operation of the touch interface is described further with reference to FIGS. 6a, 6b, and 6c.

It is to be understood again that the structure of the electronic device 10 could be supplemented and varied in many ways.

Figure 4A:
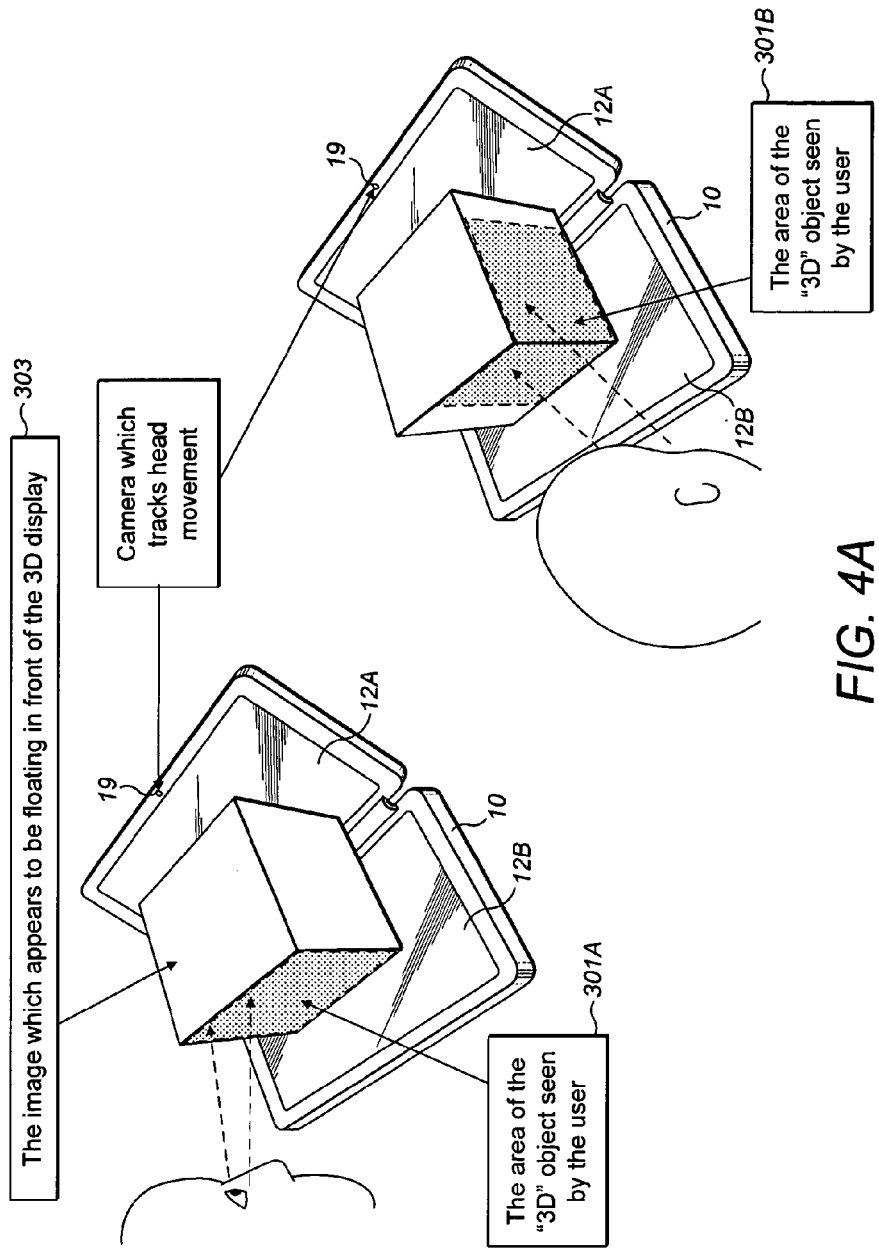
FIG. 4a shows a schematic representation of head position tracking in some embodiments of the application.
Figure 4B:
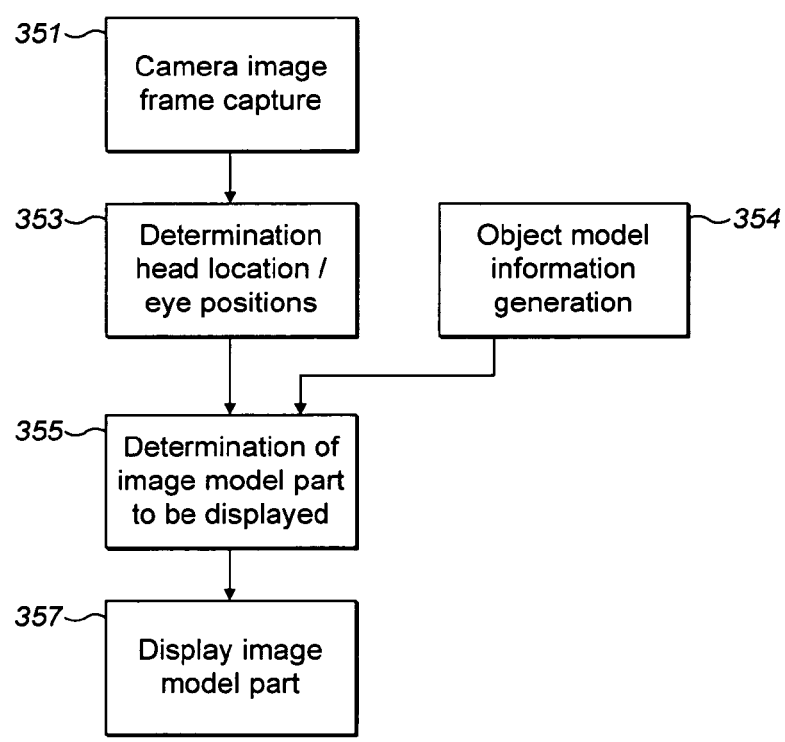
FIG. 4b shows a flow diagram of the processes carried out in head position tracking according to some embodiments.
Figure 5A:
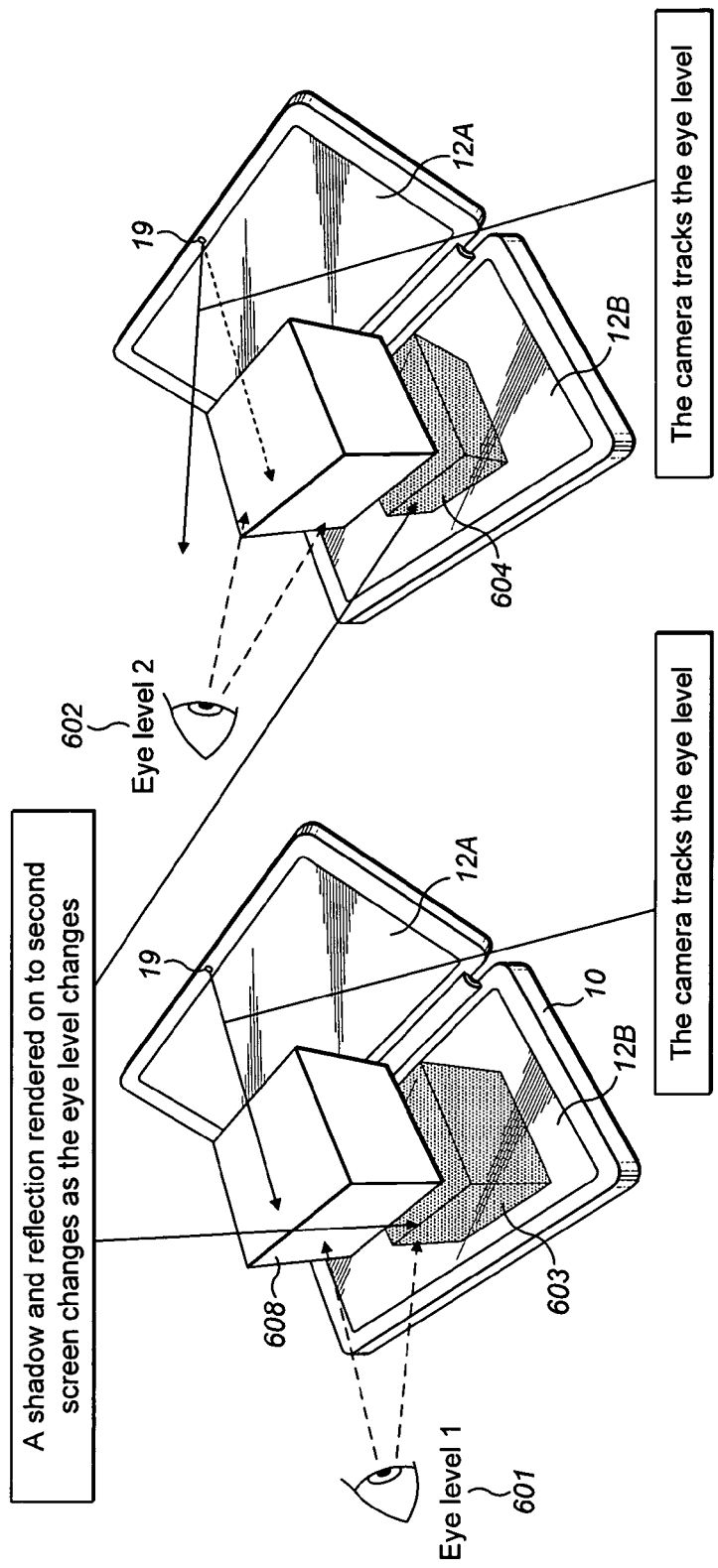
FIG. 5a shows a schematic representation of reflection/shadow generation for images according to some embodiments of the application.
Figure 5B:
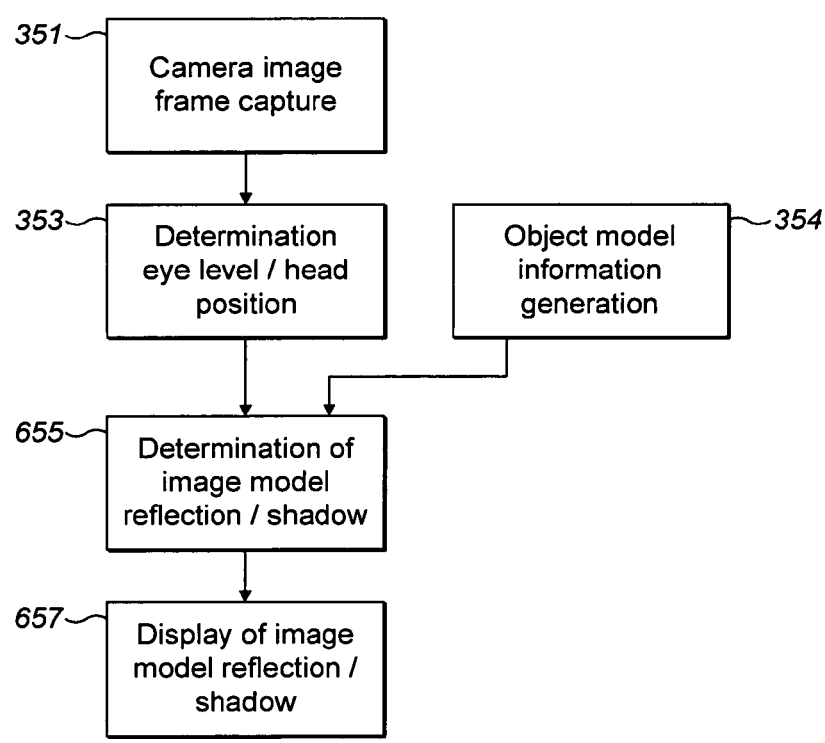
FIG. 5b shows a flow diagram of the process carried out in reflection/shadow generation according to some embodiments.

It would be appreciated that the schematic structures described in FIGS. 4a, 5a, 6a, 6b, and 7 and the method steps in FIGS. 4b, 5b, and 6c represent only a part of the operation of a complete system comprising some embodiments of the application as shown implemented in the electronic device shown in FIG. 1.

Figure 3:
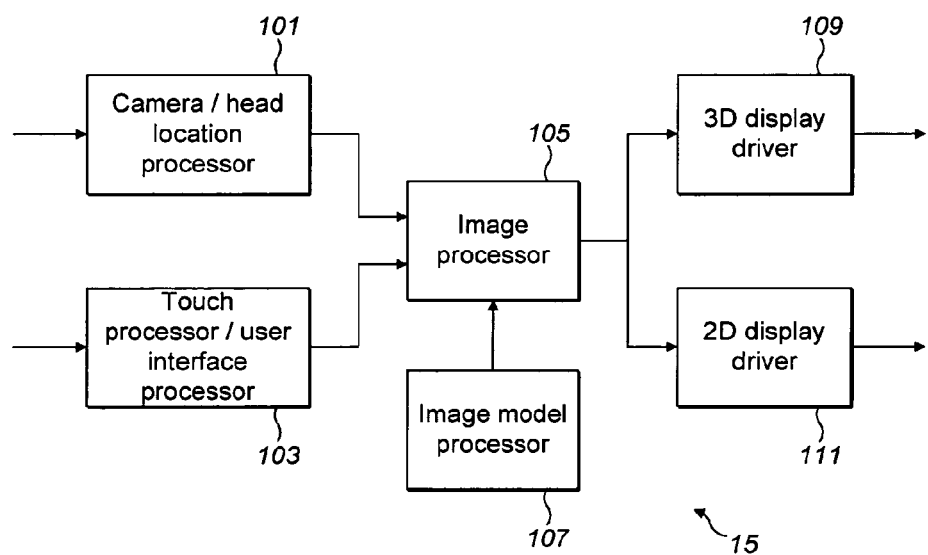
FIG. 3 shows a schematic representation of the processing components in apparatus according to some embodiments of the application.

A schematic representation of the processor 15 configuration for some embodiments is shown in further detail with respect to FIG. 3. The processor 15 is shown to comprise a camera/head location processor 101 which is configured to receive camera image information and identify objects and their position/orientation from the camera 19 image information. In some embodiments the camera processor 101 is configured to determine from the camera image information the location and orientation of the head of the user. The camera processor 101 may in some embodiments receive the head image taken by the camera 19 and project the 2D image data onto a surface such as a cylinder to provide a stabilised view of the face independent of the current orientation, position and scale of the surface model. From this projection the orientation and position may be estimated. However it would be understood that any suitable head tracking algorithm may be used, for example eye tracking and registration algorithms described within "fast, reliable head tracking under varying illumination: an approach based on registration of texture mapped 3D models" by Kaskia et at as described within the Computer Science Technical Report, May 1999. In some further embodiments where two images are captured by two cameras located or orientated differently the difference in between the images may be used to estimate the position and orientation of the face based on the knowledge of the differences between the cameras.

In some further embodiments of the application the camera processor 101 may be configured to further determine the distance of separation of the eyes on the head of the user.

In some further embodiments the camera processor 101 may be configured to identify a finger or other pointing object and furthermore the relative position of the finger (or pointing object) to the auto-stereoscopic display.

The camera/head location processor 101 outputs an indication of the object identified and furthermore the position and/or orientation of the object identified relative to the display to the image processor 105.

The processor 15 may further comprise a touch processor/user interface processor 103 configured to receive input from the user interface 14 such as the touch interface implemented within either of the first display 12a or second display 12b according to some embodiments. In further embodiments the user interface 14 may comprise other input means such as mice, keyboard, keypad or any other suitable user input apparatus. The user interface processor 103 processes the input from the user to determine whether a relevant input has been received with respect to the image display. For example the user interface processor may receive the values of capacitance from a display surface touch interface and from the capacitance value determiner a location along a display surface which has been touched. In further embodiments the user interface processor 103 may determine from the capacitance value the distance of the 'touching' object from the surface of the display. Thus the touch interface may not require direct contact to detect an object in sensing range of the touch interface. Furthermore although the touch is described above and hereafter with respect to a physical object detected, such as a user finger, it would be understood that in some embodiments a the user interface processor detects and processes data about a virtual object, such as an image of a pointer displayed by the display and which may be controlled by use of the mouse, trackball, keys or any suitable control means.

The user interface processor 103 may output to the image processor 105 an indication of what the object is and where the object (which as described above may be a physical object or a displayed 'virtual' object) used by the user is touching or pointing.

The processor 15 may further comprise an image model processor 107. The image model processor is configured in some embodiments to store a series of image models which may be used by the image processor 105. For example the image model processor may store the three dimensional image data models in order to create the three dimensional display image generated by the image processor 105. Thus in some embodiments the image model processor stores a series of models of geometric shapes or meshes describing the elements which make up the environment displayed by the image processor.

The processor 15 may further comprise an image processor 105 configured to receive the camera, user interface and image model information and generate the image to be displayed for both the two displays. Further examples are described hereafter. The image processor 105 outputs the images to be displayed on the displays to the 3D display driver 109 and the 2D display driver 111.

The 3D display driver 108 receives the display image data for the first display from the image processor 105 and generates the data to be supplied to the first (3D) display 12a in the form of the left eye image data and the right eye image data in order to project the three dimensional image. Furthermore in some embodiments the 3D display driver may dependent on the distance of the separation of the eyes and/or position of the users head control the parallax barrier (or similar left-right eye separation display control) in order to produce a more optimal 3D display image.

Similarly the 2D display driver receives the display image data from the image processor 105 for the second display 12b and generates the data for the second (2D) display 12b.

With respect to FIGS. 4a and 4b the interaction in some embodiments between the camera processor 101, image processor 105, image model processor 107 and the 3D display driver 109 is described in further detail. The apparatus 10 is shown in FIG. 4a being operated so to generate a 3D image using the 3D display 12b. The 3D image generated in this example is a cuboid which appears to the user to be floating in front of the 3D display.

The camera 19 in some embodiments is configured to capture image frame data and pass the image frame data to the camera processor 101, The operation of the camera capturing image frame data is shown in FIG. 4b by step 351.

The camera processor 101 as described previously may process the image frame data and from this data determine the head position and orientation and in some embodiments the eye position of the user. The determination of the head position/orientation and eye positions is by any suitable head modelling process such as described previously. This head and eye information may then be passed to the image processor 105. The determination of the head location and eye position is shown in FIG. 4b by step 353.

The image model processor 107 may on determining the object to be displayed retrieve or generate the object model information and furthermore pass this object model information to the image processor 105. For example as shown in FIG. 4a, the image to be displayed may be a cuboid with non-textured, flat sides. Thus the image model processor 107 may provide the dimensions and the orientation of the cuboid to the image processor 105. The generation of the object model information is shown in FIG. 4b by step 354.

The image processor 105 having received the head/eye information and the object model information (for example the dimensions and orientation of the object or objects to be displayed) may then in some embodiments determine the area or surface of the 3D object which is possible to be viewed by the user. The image processor 105 may use the geometric relationship between the position and orientation of the users head and the position and orientation of the object to be displayed to thus determine the area which could be seen from the detected viewpoint. The operation of determination of the image model surface to be displayed is shown in FIG. 4b in step 355.

The image processor 105 may then output to the 3D display driver 109 the data for generating a left and right eye image to be output to the 3D display 12a and thus to generate the images to the left and right eyes to provide the image which appears to be floating in front of the 3D display. The operation of displaying the image from the 3D display driver 109 is shown in FIG. 4b by step 357.

Thus in some embodiments and as shown in FIG. 4a, when the user is detected as looking directly face-on to the cuboid, the user is provided with left and right eye images which present only the images of the face of the cuboid. In other words the image processor 105 outputs to the 3D display driver 109 information allowing the 3D display driver 109 to generate the left and right eye images to provide the 3D display the data to present only the face of the cuboid 301a. However when the user moves to one side of the cuboid as can be seen by the right hand part of FIG. 4a, the motion of the head/eyes and thus the position displacement is determined by the camera processor 101 which passes this information to the image processor 105. The image processor may then in some embodiments determine that the user can from the detected viewpoint see at least two faces of the cuboid and thus the image processor sends information to the 3D display driver 109 the information permitting the generation of left and right eye images to enable the 3D display 12a to present the cuboid surface with two faces which can be seen by the user 301b.

Although the above description only details the interaction of the camera and a single 3D object image, it would be understood that the same operations and apparatus may display more than a single object and furthermore the detection of the position of the head would permit different objects to be viewed at different angles. Thus for example where two objects are modelled from a first point of view the image processor may determine that one object completely obscures a second object, in other words that the second object is in the shadow of the first from the detected viewpoint, whereas when the image processor 105 receives information that the head position has moved sufficiently the image processor 105 may then in some embodiments pass the information to the 3D display driver 109 information enabling the rendering of both objects.

Thus in these embodiments there is a greater level of interactivity with the display than can be found in conventional auto-stereoscopic displays which do not react to the motion of the user.

Thus in some embodiments there may be a method comprising detecting the position and orientation of a user viewpoint with respect to an auto-stereoscopic display, determining a surface viewable from the user viewpoint of at least one three dimensional object, and generating a left and right eye image for display on the auto-stereoscopic display dependent on the surface viewable from the user viewpoint.

Furthermore the method of such embodiments may detect the position and orientation of a user by capturing at least one image of the user and determining the position and orientation of the user eyes with respect to the auto-stereoscopic display.

Also in some embodiments capturing at least one image of the user may comprise capturing at least one image of the user from each of at least two cameras, and detecting the position and orientation comprises comparing the difference between the at least one image of the user from each of the at least two cameras.

In some embodiments determining a surface viewable from the user viewpoint comprises determining a model of the at least one three dimensional object, determining the distance and orientation from the at least one three dimensional object model to the user viewpoint and generating a surface of the at least one three dimensional object dependent on the model of the at least one three dimensional object and the distance and orientation from the at least one three dimensional object model to the user viewpoint.

In some embodiments of the invention, the image processor 105 furthermore determines when the location and position of the user has moved so that the auto-stereoscopic image filters (such as the parallax barriers) are not optimal. In such embodiments the image processor 105 may generate a message to be displayed indicating that the user is moving out of the optimal viewing range. In other embodiments the image processor may generate information to be passed to the 3D display driver 109 to change the filters. For example where the 3D display 12b has controllable parallax barriers to filter the left and right eye images, the image processor may pass to the 3D display driver information permitting the shifting of the parallax barrier to maintain the three dimensional image. In some other embodiments, for example where the display itself is steerable the image processor 105 may further generate information to enable the display to be steered to maintain the 3D object presentation. For example where the display is implemented on a twisting hinge the hinge may twist to enable the user to move round the apparatus but maintain the display of the 3D image.

Furthermore in some embodiments the camera processor 101 may determine the intra-pupil distance and pass this information to the image processor. This information may furthermore in some embodiments permit the image processor 105 to send information to the 3D display driver to permit optimisation of the parallax barrier so that the left and right eye images and the image filtering operation is more optimised for the specific user. For example as children have smaller inter-pupil distances the image processor may optimize the experience for children or adults as settings used for adults would produce poor 3D imaging results for children and vice versa.

With respect to FIGS. 5a and 5b, further embodiments of the application are shown whereby further interaction between the camera 19, 3D display 12a and 2D display 12b is shown in further detail. The operation of the 3D display element is in some embodiments the same as described above whereby the camera monitors the users head/eye position and together with the knowledge of the object to be displayed generates left and right eye images to generate the 3D image of the object from the viewpoint of the user. Such images may be further improved by the addition and implementation of at least one 2D display 12b as is described hereafter.

As described in the embodiments describing the interaction of the camera and the 3D display 12a the camera 19 in some embodiments is configured to capture image frame data and pass the image frame data to the camera processor 101. The operation of the camera capturing image frame data is shown in FIG. 5b by step 351. It would be understood that the same image data captured and processed in the 3D interaction embodiments as described above may also be used in the 2D interaction embodiments described hereafter. Where similar or the same process is described then the same reference number is reused.

The camera processor 101 as described previously may also process the image frame data and from this data determine the head position and orientation and in some embodiments the eye position of the user. The determination of the head position/orientation and eye positions is by any suitable head modelling process such as described previously. In some embodiments this eye information may comprise determining the eye level of the user relative to the display. This head and eye information may then be passed to the image processor 105. The determination of the head location and eye position is also shown in FIG. 5b by step 353.

The image model processor 107 may on determining the object to be displayed retrieve or generate the object model information and furthermore pass this object model information to the image processor 105. For example as shown in FIG. 5a, the image to be displayed may be a cuboid with non-textured, flat sides. Furthermore in some embodiments the object model may also comprise lighting information, surface reflectivity information, object location, and furthermore ground information, such as texture and reflectivity of the surface above with the object is 'floating'. Thus the image model processor 107 may provide this information to the image processor 105. The generation of the object model information is shown in FIG. 5b by step 354.

The image processor 105 having received the head/eye information and the object model information (for example the dimensions and orientation of the object or objects to be displayed) may then in some embodiments determine the area or surface of the 3D object which is possible to be viewed by the user within the 2D surface beneath the 3D object. In other words the image processor may determine a projection surface of the 3D object onto the 2D display. In some embodiments the object or surface which may be determined may be a shadow projected by the 3D object onto the ground where the ground is not reflective and the object light source is above the object. In some other embodiments the area or surface projected which may be determined may be a reflection of the 3D object seen in the ground as represented by the 2D display 12b.

The operation of determination of the image model surface to be displayed by the 2D display is shown in FIG. 5b in step 655.

The image processor 105 may then output to the 2D display driver 111 the data for generating an image to be output to the 2D display 12b and thus to generate the image of the surface (such as a shadow or reflection on the ground from the object appearing to be floating in front of the 3D display. The operation of displaying the image from the 2D display driver 111 is shown in FIG. 5b by step 657.

For example as shown on the left hand side of FIG. 5a the object to be displayed is a cuboid 608 similar to that shown in the example presented above. The camera processor 101 having received the image frame data from the camera 19 may in some embodiments determine a first eye level 601 and pass this information to the image processor. The image processor having received the object model information and the ground information may determine the first surface 603 which would be viewed from the first eye level 601 such as a shadow and/or reflection. The image processor 105 may determine this surface using a virtual image modelling process. This surface information may then be passed to the 2D display driver 111 to render the image for the 2D display 12b.

Furthermore as shown by the right hand side of FIG. 5a the camera may take further images to be processed by the camera processor 101. The camera processor may thus supply updated information to the image processor 105 such as a change in the eye level to a second eye level 602. This change in eye level to the second eye level would then dependent on the object and ground model information be processed by the image processor to generate an updated surface 604 which would be viewed from the second eye level 602. This surface information may thus be passed to the 2D display driver 111 to render the image for the 2D display 12b. The virtual image 603, 604 may then be output to the display driver 111 to be output upon the 2D display 12b.

The implementation of the camera tracking the eye level and the display of the reflection and/or shadow images on the 2D display together with the 3D display images would in embodiments present a more immersive experience as cues such as depth would be more easily presented.

Thus in embodiments of the application there may be a method which comprises detecting the position and orientation of a user viewpoint with respect to an auto-stereoscopic display, determining a projection surface viewable from a user viewpoint of at least one three dimensional object on a second display; and generating a projection image for display on the second display dependent on the projection surface viewable from the user viewpoint.

In such embodiments the method may further comprise determining the projection surface viewable from the user viewpoint dependent on at least one of at least one three dimensional object lighting angle and position, a second display surface model, and at least one three dimensional object surface model.

The projection surface in such embodiments may comprise at least one of a partial shadow of the at least one three dimensional object, a total shadow of the at least one three dimensional object, and a reflection of the at least one three dimensional object.

Embodiments of the application may further improve on conventional 3D display technology by further providing image interactivity. With respect to FIGS. 5a, 5b and 5c the operation of user-image interactivity is described in some embodiments where the user interface 14, user interface processor 103, image model processor 107, and image processor 105 may produce an improved 3D object imaging experience.

The operation of the user interface 14, for example in some embodiments implementing a 'touch' interface on the 2D display 12b can be shown in FIG. 6a. In FIG. 6a the apparatus 10 shown is similar to the apparatus shown in previous figures where the apparatus 10 comprises the 3D display 12a, the 2D display 12b and camera 19. The 2D display 12b in these embodiments further comprises a capacitive user interface 14. The capacitive user interface 14 may be configured to detect the presence or 'touch' of an object relative to the display. Thus as shown in FIG. 6a the user interface may detect the presence of a finger and furthermore generate information which may indicate that the finger tip is at a position over the 2D display 12b with a relative X axis displacement 401, and a relative Y axis displacement 403, both of which within the plane of the 2D display 12b. Furthermore in some embodiments the user interface may detect the presence of the fingertip at a distance from the surface of the 2D display 12b or in other words determine the fingertip having a relative Z axis displacement 405 above the 2D display 12b. The user interface 14 may further output the sensed values, such as capacitance array values to the user interface processor 103.

The capture of user interface input data is shown in FIG. 6c by step 451.

The user interface processor 103 may in some embodiments receive the user interface data and determine the position of the detected object or tip of the detected object (for example the user's finger). It is understood that in some embodiments the finger may be replaced by any suitable pointing device such as a stylus.

Although the above and following operations are described with respect to the data or information received from the user interface 14 and the user interface processor 103 it would be appreciated that similar information may be generated from the camera 19 and camera processor 101 where in some embodiments the camera is configured to detect the presence of the user attempting to interface with the apparatus. Thus for example in some embodiments using multiple cameras the difference in camera images may be used to determine the x-axis, y-axis, and z-axis displacement for a detected object as measured from the 2D display surface.

Thus user interface processor 103 may output the position of the detected object to the image processor 105.

The determination of the presence of the object is shown in FIG. 6c by step 453.

The detection of the presence of the object and the determination of the object in three dimensional space relative to the apparatus may be used in embodiments of the application to interact with the modelled object image. For example the detection of the finger 'touching' the displayed object may be used to modify the displayed object.

The image processor 105 may in some embodiments, as described previously, also receive the image model data from the image model processor 107. As has been described previously, the image model processor 107 may contain data such as the location and orientation and shape of the object being displayed. The generation and supply of the model object information is shown in FIG. 6c by step 454.

This information may be passed to the image processor 105 where the image processor 105 in some embodiments may be configured to correlate the detected object position with the modelled object as displayed. For example the image processor 105 may detect that the modelled object location and the detected object are the same, or in other words the detected object 'touches' the displayed object. In some embodiments the type of touch may further determine how the displayed object is to be modified. For example the 'touch' may indicate a single press similar to the single click of a mouse or touchpad button and thus activate the function associated with the surface touched. In other embodiments the 'touch' may indicate a drag or impulse operation and cause the object to rotate or move according to the 'touch'.

The determination of the image part which is 'touched' and the action carried out by the determination of the 'touch' can be shown in FIG. 6c by step 455.

The image processor 105 may in some embodiments process the interaction between the detected object and the three dimensional object. For example in some embodiment the image processor 105 may output to the 3D display driver 109 data indicating the location of the touch by passing information displaying the object a different colour at the point of touch. In other embodiments image processor may output the interaction of the touch to move either by displacement or rotation and so give the effect that the user has moved the object. In other embodiments the image processor may process the interaction in such a way to implement a deformation in the object at the point of contact. In such embodiments the image processor 105 may thus apply a suitable physics model to the interaction of the detected object and the displayed object and outputs the result of such interaction to the 3D display driver 109 thus enabling the rendering of the modified displayed object.

It would be understood that in some embodiments the interaction with the 3D auto-stereoscopic image, in other words the 3D object and the detected object (such as a fingertip or virtual fingertip) may be performed independently of the detection of the head or eye and the manipulation of the 3D object based on the detected head or eye position. So that in such embodiments, for example embodiments implemented on devices without camera modules or sufficient processing for head detection processing, may still be implemented giving the user an improved image interaction experience.

The display of the touched part or the display of the interaction operation of the touch can be shown in FIG. 6c by step 457.

Thus in some embodiments of the application the implementation of image interaction as sensed by the user interface 14 or camera 19, detected by the user interface processor 103 or camera interface 101, and applied by the image processor 105 may improve the interactivity of the 3D displayed object.

For example with regards to FIG. 6b the user's finger is shown being tracked on a 3D image and shown on the 3D image 400.

Figure 7:
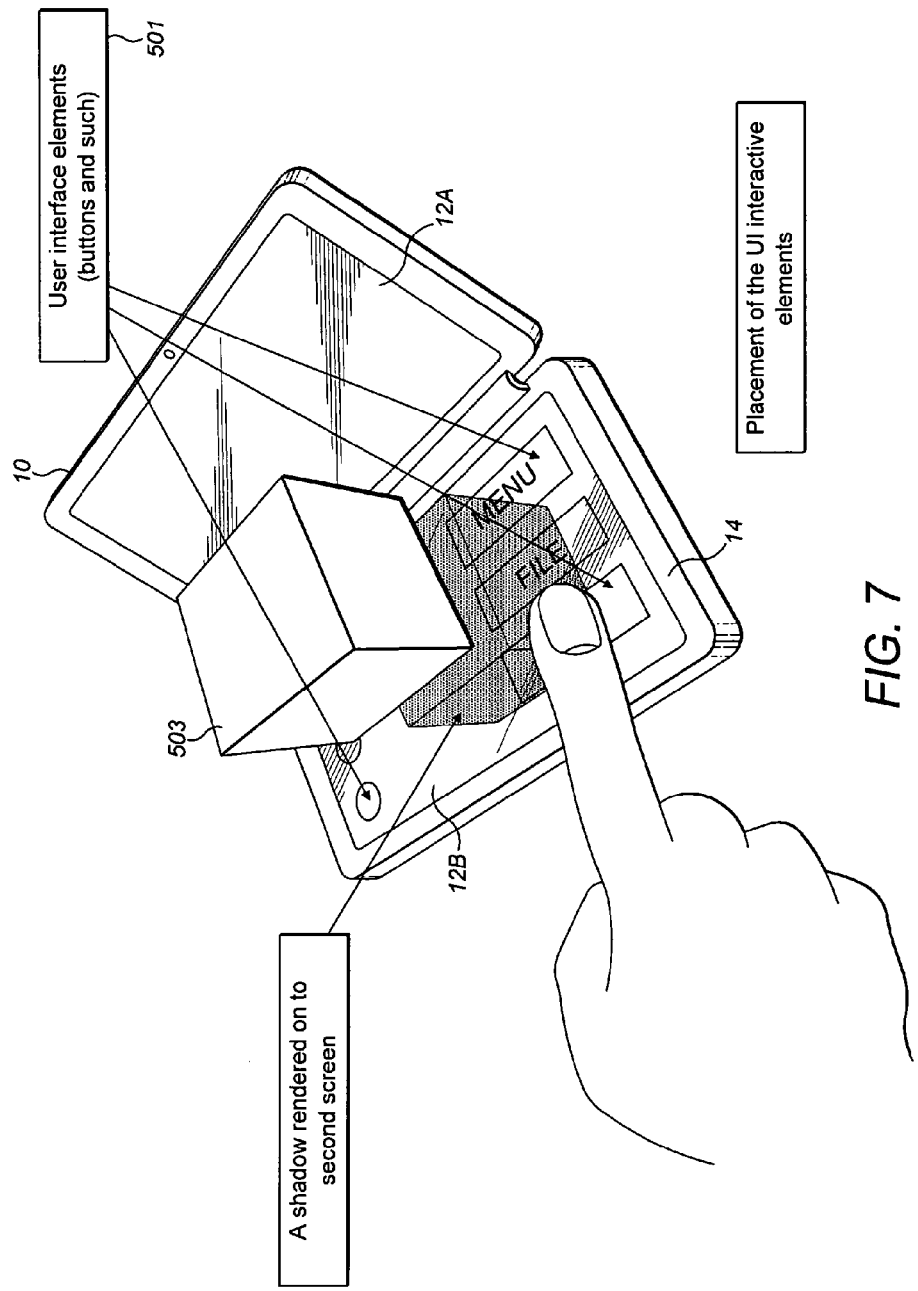
FIG. 7 shows a further physical schematic representation of user interface interaction according to some embodiments of the application.

With respect to FIG. 7 the further implementation of user interface elements on the 2D display in some further embodiments is also shown. In these embodiments of the application the 2D display 12b may display images such as user interface buttons which are capable of being "touched" by the user. The user interface elements 501 may in some embodiments also be implemented as additional three dimensional objects and as such displayed using the three dimensional display 12a. Such an embodiment is shown in FIG. 7 where 2D user interface buttons 501 are shown displayed on the two dimensional display 12b and are capable of being touched by the user and a further 3D user interface object is shown 503 on which the user interface may detect interaction with and perform appropriate actions and display changes.

Therefore in some embodiments there may be a method comprising detecting an object position with respect to either the auto-stereoscopic display and/or a second display and determining an interaction by the detected object.

In such embodiments detecting an object position may thus comprise at least one of detecting an capacitance value in a capacitance sensor of the object and detecting a visual image of the object.

Furthermore determining an interaction by the detected object may in some embodiments comprise determining an intersection between the detected image and a displayed image.

The displayed image may in such embodiments comprise the virtual image of the at least one three dimensional object or a two dimensional image displayed on the second display.

Thus embodiments of the application permit the two displays to produce much more realistic or believable three dimensional image projection. Furthermore the interaction between the detection of the eye and/or head position/orientation and the object to be projected permits more efficient interaction with the displayed object or objects. Furthermore in further embodiments as described above, the implementation of user interface elements on the display permits more interactive three dimensional display configurations and experiences.

It shall be appreciated that the term user equipment is intended to cover any suitable type of wireless user equipment, such as mobile telephones, portable data processing devices or portable web browsers. Furthermore user equipment, universal serial bus (USB) sticks, and modem data cards may comprise apparatus such as the apparatus described in embodiments above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus some embodiments may be implemented as apparatus comprising: a sensor configured to detect the position and orientation of a user viewpoint with respect to an auto-stereoscopic display; a processor configured to determine a surface viewable from the user viewpoint of at least one three dimensional object; and an image generator configured to generate a left and right eye image for display on the auto-stereoscopic display dependent on the surface viewable from the user viewpoint.

The sensor may in some embodiments comprise a camera configured to capture at least one image of the user and a face recognizer configured to determine the position and orientation of the user eyes with respect to the auto-stereoscopic display.

In some embodiments there may be at least two cameras capturing at least one image of the user from each of the at least two cameras, and the face recognizer may compare the difference between the at least one image of the user from each of the at least two cameras.

The processor in some embodiments may determine a model of the at least one three dimensional object; determine the distance and orientation from the at least one three dimensional object model to the user viewpoint; and generate a surface of the at least one three dimensional object dependent on the model of the at least one three dimensional object and the distance and orientation from the at least one three dimensional object model to the user viewpoint.

The processor may in some embodiments further detect an inter-pupil distance of a user; and provide control information to a parallax barrier dependent on at least one of: the position of the user viewpoint; the orientation of the user viewpoint; and the inter-pupil distance of the user.

The processor may in some embodiments further determine a projection surface viewable from the user viewpoint of at least one three dimensional object on a second display; and the image generator may generate a projection image for display on the second display dependent on the projection surface viewable from the user viewpoint.

The processor may in some embodiments determine the projection surface viewable from the user viewpoint dependent on at least one of: at least one three dimensional object lighting angle and position; a second display surface model; and at least one three dimensional object surface model.

The projection surface may comprise at least one of: a partial shadow of the at least one three dimensional object; a total shadow of the at least one three dimensional object; and a reflection of the at least one three dimensional object.

The sensor may be further configured to detect an object position with respect to either the auto-stereoscopic display and/or a second display; and determine an interaction by the detected object.

The sensor in some embodiments may detect an object position by detecting at least one of a capacitance value in a capacitance sensor of the object; and a visual image of the object.

The processor may further determine an intersection between the detected image and a displayed image.

The displayed image may comprise the virtual image of the at least one three dimensional object.

The displayed image may comprise a two dimensional image displayed on the second display.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, and CD and the data variants thereof.

Thus some embodiments may be implemented by a computer-readable medium encoded with instructions that, when executed by a computer perform: detect the position and orientation of a user viewpoint with respect to an auto-stereoscopic display; determine a surface viewable from the user viewpoint of at least one three dimensional object; and generate a left and right eye image for display on the auto-stereoscopic display dependent on the surface viewable from the user viewpoint.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

As used in this application, the term circuitry may refer to all of the following: (a) hardware-only circuit implementations (such as implementations in only analogue and/or digital circuitry) and (b) to combinations of circuits and software (and/or firmware), such as and where applicable: (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of circuitry applies to all uses of this term in this application, including in any claims. As a further example, as used in this application, the term circuitry would also cover an implementation of merely a processor (or multiple processors) or portion of a processor and its (or their) accompanying software and/or firmware. The term circuitry would also cover, for example and if applicable to the particular claim element, a baseband integrated circuit or applications processor integrated circuit for a mobile phone or a similar integrated circuit in server, a cellular network device, or other network device.

The term processor and memory may comprise but are not limited to in this application: (1) one or more microprocessors, (2) one or more processor(s) with accompanying digital signal processor(s), (3) one or more processor(s) without accompanying digital signal processor(s), (3) one or more special-purpose computer chips, (4) one or more field-programmable gate arrays (FPGAS), (5) one or more controllers, (6) one or more application-specific integrated circuits (ASICS), or detector(s), processor(s) (including dual-core and multiple-core processors), digital signal processor(s), controller(s), receiver, transmitter, encoder, decoder, memory (and memories), software, firmware, RAM, ROM, display, user interface, display circuitry, user interface circuitry, user interface software, display software, circuit(s), antenna, antenna circuitry, and circuitry.

The invention claimed is:
1. A method comprising:
    detecting the position and orientation of a user viewpoint with respect to an auto-stereoscopic display based on a processing of information pertaining to the user viewpoint;
    determining a surface viewable from the user viewpoint of at least one three dimensional object;
    generating a left and right eye image for display on the auto-stereoscopic display dependent on the surface viewable from the user viewpoint;
    determining a projection surface viewable from the user viewpoint of at least one three dimensional object on a second display;
    detecting the position of an object relative to dimensions of the projection surface via a touch input interface; and
    generating a projection image for display on the second display dependent on the projection surface viewable from the user viewpoint;
    wherein determining a surface viewable from the user viewpoint of at least one three dimensional object comprises determining a model of the at least one three dimensional object, determining the distance and orientation from the at least one three dimensional object model to the user viewpoint, and generating a surface of the at least one three dimensional object dependent on the model of the at least one three dimensional object and the distance and orientation from the at least one three dimensional object model to the user viewpoint;
    wherein the projection surface comprises at least one of a partial shadow of the at least one three dimensional object, a total shadow of the at least one three dimensional object, and a reflection of the at least one three dimensional object; and
    wherein the shadow or reflection rendered on the projection surface changes as an eye level indicative of the user viewpoint changes.

2. The method as claimed in claim 1, further comprising:
    detecting an inter-pupil distance of a user; and
    controlling a parallax barrier dependent on at least one of:
    the position of the user viewpoint;
    the orientation of the user viewpoint; and
    the inter-pupil distance of the user.

3. The method as claimed in claim 1, further comprising determining the projection surface viewable from the user viewpoint dependent on at least one of:
    at least one three dimensional object lighting angle and position;
    a second display surface model; and
    at least one three dimensional object surface model.

4. The method as claimed in claim 1, wherein detecting the position and orientation of a user viewpoint comprises:
    capturing at least one image of the user;
    determining the position and orientation of the user eyes with respect to the auto-stereoscopic display.

5. The method as claimed in claim 4, wherein capturing at least one image of the user comprises capturing at least one image of the user from each of at least two cameras, and detecting the position and orientation comprises comparing the difference between the at least one image of the user from each of the at least two cameras.

6. The method as claimed in claim 1, further comprising:
    detecting an object position with respect to either the auto-stereoscopic display and/or a second display; and
    determining an interaction by the detected object, and wherein detecting an object position comprises at least one of:

detecting an capacitance value in a capacitance sensor of the object; and detecting a visual image of the object, and wherein determining an interaction by the detected object comprises determining an intersection between the detected image and a displayed image.

7. The method as claimed in claim 6, wherein the displayed image comprises the virtual image of the at least one three dimensional object.

8. The method as claimed in claim 6, wherein the displayed image comprises a two dimensional image displayed on the second display.

9. An apparatus comprising at least one processor and at least one memory including computer program code, the at least one memory and the computer program code configured to, with the at least one processor, cause the apparatus at least to detect the position and orientation of a user viewpoint with respect to an auto-stereoscopic display based on a processing of information pertaining to the user viewpoint;

determine a surface viewable from the user viewpoint of at least one three dimensional object;

detect the position of an object relative to dimensions of the projection surface via a touch input interface;

generate a left and right eye image for display on the auto-stereoscopic display dependent on the surface viewable from the user viewpoint;

determine a projection surface viewable from the user viewpoint of at least one three dimensional object on a second display; and generate a projection image for display on the second display dependent on the projection surface viewable from the user viewpoint;

wherein causing the apparatus to determine a surface viewable from the user viewpoint of at least one three dimensional object causes the apparatus at least to determine a model of the at least one three dimensional object, determine the distance and orientation from the at least one three dimensional object model to the user viewpoint, and generate a surface of the at least one three dimensional object dependent on the model of the at least one three dimensional object and the distance and orientation from the at least one three dimensional object model to the user viewpoint;

wherein the projection surface comprises at least one of a partial shadow of the at least one three dimensional object, a total shadow of the at least one three dimensional object, and a reflection of the at least one three dimensional object; and wherein the shadow or reflection rendered on the projection surface changes as an eye level indicative of the user viewpoint changes.

10. The apparatus as claimed in claim 9, wherein the computer program code is configured to, with the at least one processor further cause the apparatus at least to detect an inter-pupil distance of a user; and control a parallax barrier dependent on at least one of:

the position of the user viewpoint;

the orientation of the user viewpoint; and the inter-pupil distance of the user.

11. The apparatus as claimed in claim 9, wherein the computer program code is configured to, with the at least one processor further cause the apparatus at least to determine the projection surface viewable from the user viewpoint dependent on at least one of:

at least one three dimensional object lighting angle and position;

a second display surface model; and at least one three dimensional object surface model.

12. The apparatus as claimed in claim 9, wherein the computer program code is configured to, with the at least one processor, further cause the apparatus at least to detect an object position with respect to either the auto-stereoscopic display and/or a second display; and determine an interaction by the detected object, and wherein detecting an object position cause the apparatus at least to detect a capacitance value in a capacitance sensor of the object; and detect a visual image of the object, and wherein causing the apparatus to determine an interaction by the detected object causes the apparatus at least to determine an intersection between the detected image and a displayed image.

13. The apparatus as claimed in claim 9, wherein the displayed image comprises one of the virtual images of the at least one three dimensional object and a two dimensional image displayed on the second display.

14. The apparatus as claimed in claim 9, wherein causing the apparatus to detect the position and orientation of a user viewpoint causes the apparatus at least to capture at least one image of the user;

determine the position and orientation of the user eyes with respect to the auto-stereoscopic display.

15. The apparatus as claimed in claim 14, wherein causing the apparatus to capture at least one image of the user causes the apparatus at least to capture at least one image of the user from each of at least two cameras, and detect the position and orientation cause the apparatus at least to compare the difference between the at least one image of the user from each of the at least two cameras.

16. An apparatus comprising:

a sensor configured to detect the position and orientation of a user viewpoint with respect to an auto-stereoscopic display based on information pertaining to the user viewpoint;

a processor configured to determine a surface viewable from the user viewpoint of at least one three dimensional object, determine a projection surface viewable from the user viewpoint of at least one three dimensional object on a second display, and generate a projection image for display on the second display dependent on the projection surface viewable from the user viewpoint; wherein determining a surface viewable from the user viewpoint of at least one three dimensional object comprises determining a model of the at least one three dimensional object, determining the distance and orientation from the at least one three dimensional object model to the user viewpoint, and generating a surface of the at least one three dimensional object dependent on the model of the at least one three dimensional object and the distance and orientation from the at least one three dimensional object model to the user viewpoint;

wherein the projection surface comprises at least one of a partial shadow of the at least one three dimensional object, a total shadow of the at least one three dimensional object, and a reflection of the at least one three dimensional object; and wherein the shadow or reflection rendered on the projection surface changes as an eye level indicative of the user viewpoint changes;

a touch input interface configured to detect the position of an object relative to dimensions of the projection surface; and an image generator configured to generate a left and right eye image for display on the auto-stereoscopic display dependent on the projection surface viewable from the user viewpoint.

* * * * *